United States Patent [19]

Bricot et al.

[11] 4,039,764

[45] Aug. 2, 1977

[54] METHOD FOR PROTECTING A FLEXIBLE RECORD DISC AND DISC SO PROTECTED

[75] Inventors: Claude Bricot; Bernard Carre; Jean Claude Lehureau; Claude Puech, all of Paris, France

[73] Assignee: Thomson-Brandt, Paris, France

[21] Appl. No.: 588,157

[22] Filed: June 17, 1975

[30] Foreign Application Priority Data

June 21, 1974 France .............................. 74.21661

[51] Int. Cl.[2] .................... G11B 7/24; G11B 23/00; G11B 7/00
[52] U.S. Cl. ................... 179/100.41 L; 179/100.3 V; 274/42 R
[58] Field of Search ............. 178/6.6 R, 6.7 R, 6.7 A; 274/41.6 R, 41 R, 42 R; 179/100.41 L, 100.4 R, 100.4 M, 100.3 V, 100.3 G; 340/173 LM; 358/302, 298

[56] References Cited

U.S. PATENT DOCUMENTS

| | | | |
|---|---|---|---|
| 1,956,626 | 5/1934 | Robbins | 274/41.6 R |
| 3,009,707 | 11/1961 | Schulein | 274/42 R |
| 3,430,966 | 3/1969 | Gregg | 179/100.3 V |
| 3,518,442 | 6/1970 | Johnson | 179/100.41 L |
| 3,854,729 | 12/1974 | Downs | 274/42 R |
| 3,855,426 | 12/1974 | Bouwhuis | 274/41 R |

OTHER PUBLICATIONS

"An Experimental Television Recording + Playback System Using Photographic Discs" Rice et al., Journal of SMPTE, vol. 79, No. 11.

Primary Examiner—Jay P. Lucas
Attorney, Agent, or Firm—Cushman, Darby & Cushman

[57] ABSTRACT

A flexible record disc engraved in the form of impressions along a track located in a ring-shaped zone is protected with a second flexible disc adhering at its central portion to the non-engraved part of the record disc. In the case where read-out is carried out on a stabilizing air cushion, the air remaining between the two discs is displaced by centrifugal force, so that good conditions of optical read-out are achieved.

4 Claims, 4 Drawing Figures

METHOD FOR PROTECTING A FLEXIBLE RECORD DISC AND DISC SO PROTECTED

The present invention relates to a method for protecting a flexible record disc, compatible with optical read-out. It relates in particular to the situation in which the recording corresponds to television signals engraved in a flexible disc in the form of impressions arranged along at least one track and in which a light beam coming from an optical reader is diffracted by the impressions when the track passes beneath the read-out beam.

The protection which forms the object of the present invention is primarily against the kinds of mechanical damage during various manipulations. Scratches and scores of the kind constituting this sort of damage, create parasitic impressions or modify the initial impressions so that the quality of sound and video reproduction is more or less seriously impaired.

Methods are known which consist in protecting the impressions by using a filling of a relatively thick layer of a material which penetrates into the hollows of the engraved structure. In the case of read-out by transmission, with diffraction of the light beam, the filling material must be transparent and have a refractive index which is sufficiently different from that of the engraved material; this condition is quite difficult to achieve and leads to the sort of protection which has the drawback of reducing the amplitude of the diffraction so that the business of detecting the signals recorded on the disc is made more problematic.

The invention does not suffer from the limitations and drawbacks referred to hereinbefore. According to the invention, there is provided a method for protecting a flexible record disc having a face comprising an engraved ring-shaped zone wherein signals are engraved in the form of impressions along a track and a central flat zone, said method consisting in placing, close to said face, a flexible protective disc and in adhering the central flat zone of said record disc and the part of said flexible protective disc facing each other. The invention also relates to the protected disc obtained with such a method.

The invention will be better understood and others of its features rendered apparent from a consideration of the ensuing description and the accompanying drawings in which:

FIG. 1, relating to the prior art, illustrates part of a reader unit in the context of read-out of a flexible record disc by transmission;

Figure 1:
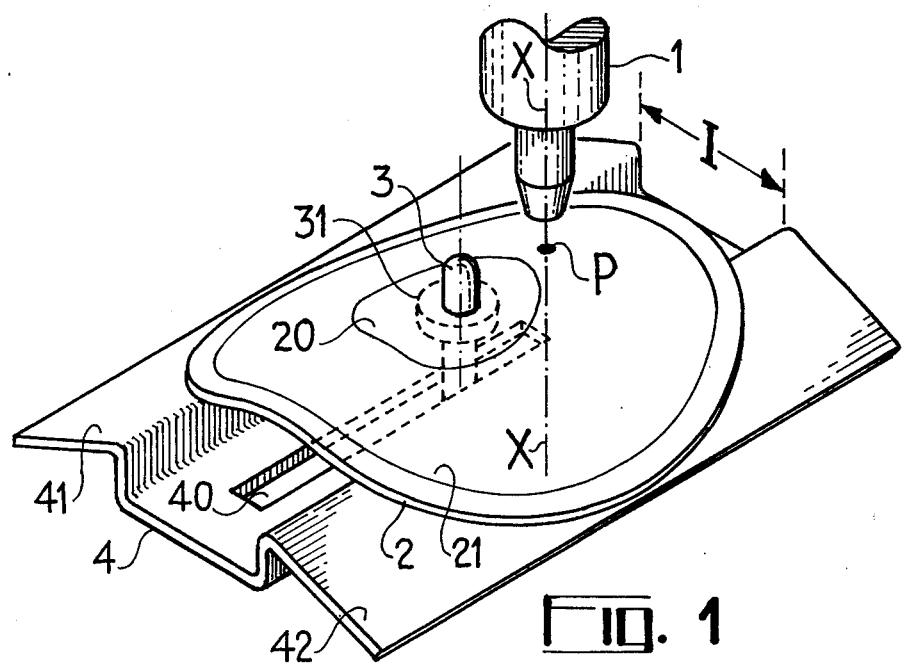

FIG. 1 illustrates some essential parts of a known optical read-out unit operating by transmission followed by diffraction. A fixed reader 1, with a vertical optical axis XX, focusses a light beam (not shown) at a point P on a flexible disc 2 constituting a record carrier engraved in the form of impressions. The impressions form a spiral track, which has not been shown, occupying a zone 21 on the disc and leaving a non-engraved zone 20 at the center. A circular shoulder 31, belonging to a vertical spindle 3 passing through the disc at the center thereof and driven by a motor which has not been shown imparted a rotary motion to the disc 2. The disc 2 is stabilised during rotation by the well-known "air cushion" system, the air cushion being created by a component 4 (stabiliser) comprising two flat slippers 41 and 42 equally inclined in relation to the horizontal plane and defining a gap I between them. The component 4 has a U-shaped section along the gap I and contains in its longitudinal plane of symmetry a slot 40 which gives free passage to the spindle 3 in order to facilitate the transverse displacement of said spindle and of the disc 2 which it carries. The pick-up point P is located in that part of the disc which crosses the gap I between the two slippers 41 and 42.

Figure 2:
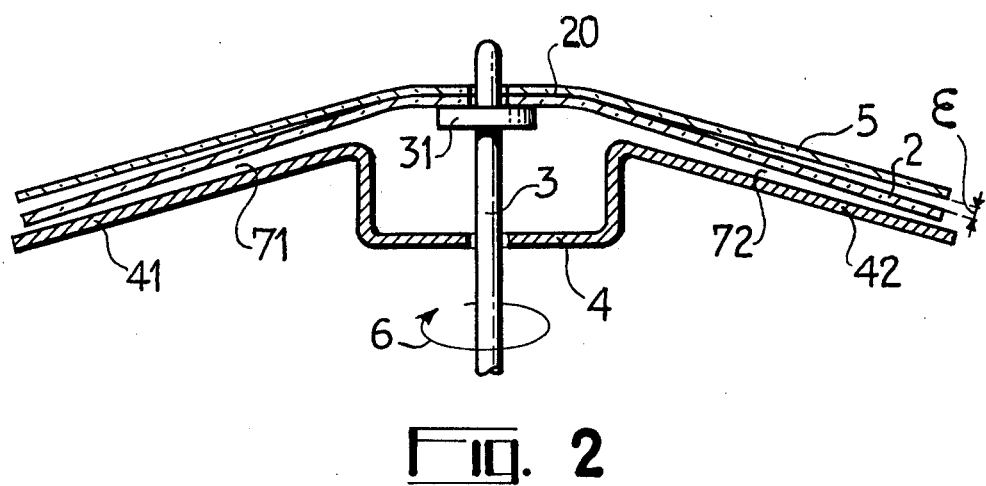
FIG. 2 illustrates in schematic section a flexible record disc protected, in accordance with the invention, with the reader unit non-operative.

In FIG. 2, there has been illustrated in elevation the spindle 3 of the apparatus shown in FIG. 1, and in schematic section the component 4 and the disc 2 covered in accordance with the invention. By way of example, a flexible disc 5 has been shown produced using the same transparent material and having the same dimensions as the disc 2. The disc 5 is stuck to the disc 2 at the latter's central zone. When the thus protected disc 2 is arranged on the shoulder 31 and on the slippers 41 and 42, air remains around the disc 2, in particular in the gap between the two flexible discs which latter, at their external portions, subtend an angle $\epsilon$. When the device is set into rotation by rotating the spindle 3, for example in the direction of the arrow 6, air circulates in the spaces 71 and 72, separating the slippers 41 and 42 from the disc 2, and is displaced by centrifugal force in the angle $\epsilon$. The result is that the two discs adhere to one another whilst an air cushion develops beneath the disc 2. This adhesion phenomenon is independent of the nature of the materials forming the discs 2 and 5, and also of the thicknesses of these discs, as long as the speed of rotation remains high (of the order of 25 revolutions/second).

Figure 3:
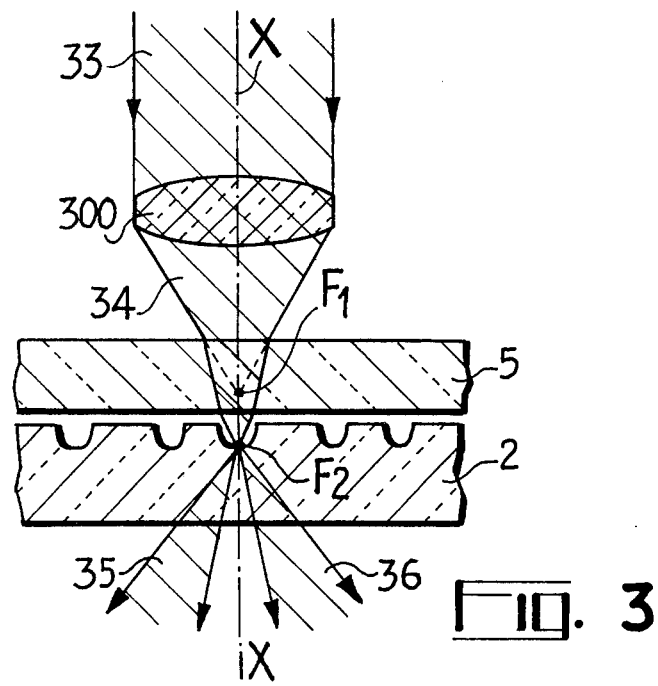
FIG. 3 illustrates an optical diagram pertaining to read out by transmission, followed by diffraction, the reader unit being operative.

In the examples illustrated in FIGS. 1 and 2, the circumstances of optical read-out are modified only very slightly as the optical diagram of FIG. 3 shows. A lens 300, of a type similar to that of the objective lens in a microscope, constitutes an essential part of the reader. This lens, which is supplied with a parallel ray beam 33 from a light source of the laser type, which has not been shown, focusses the beam at a point $F_1$ on its axis XX in the absence of the parallel faced plate constituted by that portion of the disc 5 located in the neighbourhood of the point $F_1$. The focus is then shifted from $F_1$ to $F_2$ on the axis XX due to the interposition of the disc 5 in the path of the cone of light rays 34 issuing from the beam 33. When the point $F_2$ is located at the bottom of an impression, the diffraction in particular produces two diffracted beams of orders 1 and $-1$ respectively, schematically represented at 35 and 36 in FIG. 3. Since the disc 5 substantially adheres to the disc 2 during rotation, the point $F_2$ is located at the same position whatever the disc portion which is being scanned by the read-out beam. The correction $F_1F_2$ is moreover a minimal one and need be made only once. The presence of the parallel-faced plate, however, creates a slight astigmatism which can be corrected by adjusting the lens 300. Microscope objective lenses are known which are of "pre-corrected" type, in order to make it possible to observe objects arranged behind a plate in the manner frequently occuring in biology.

In a practical embodiment of the invention, a polyvinylchloride recording disc has been used having a thickness of 0.15 mm, the protective disc 5 being constituted by an identical but non-engraved disc.

Figure 4:
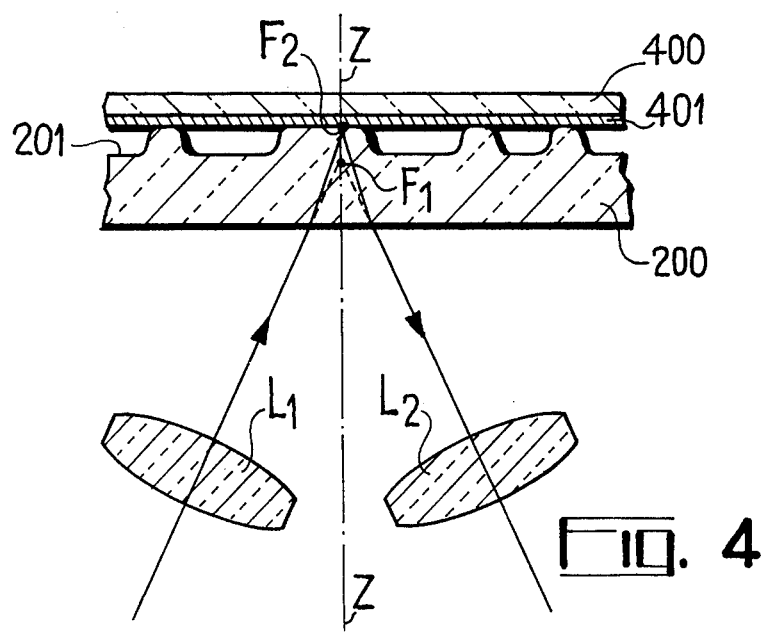
FIG. 4 illustrates an optical diagram corresponding to read-out by reflection, the reader unit being in operation.

In a variant embodiment of the invention, the read-out of the impressions is effected by reflection. The impressions are formed in relief fashion on one face 201 of a disc 200 of transparent material shown in partial section in FIG. 4, the feature here being that the section has been taken in a longitudinal plane tangential to a track of impressions. In a manner similar to the disc 5, a disc 400 has been provided which only adheres to the disc 200 at the center of the non engraved zone . The disc 400 is made of a sheet of material of "plastic" type covered with a layer 401 of metal having good reflectivity. During rotation, the sheet adheres to the impressions of the disc 200. FIG. 4 illustrates two lenses $L_1$ and $L_2$ located in the "emission" and "reception" sections of an optical reader (not shown) utilizing the mechanism of reflection. The axes of these lenses, disposed symmetrically in relation to a perpendicular ZZ to the plane of the disc 200, intersect one another at $F_1$ which is the common focus of the two lenses. By interposing the disc 200 in the path of the emitted and received light rays, the focus is shifted from $F_1$ to $F_2$. The reflection at $F_2$, when the crown of an impression is located at this point, takes place due to the application of the plastic disc 400 with its reflective layer 401, against the crowns of the impressions in the disc 200, thus creating a reflected beam which is utilized by the reader elements.

The invention uses simple and inexpensive techniques of manufacture. In the example of FIG. 3, the transparent disc 5 can be stuck to the disc 2:

either by using an adhesive which hardens by polymerisation, elementary precautions being taken to limit the stuck zone to the central parts of the discs 2 and 5;

or, if thermo-weldable materials are involved, by a process of heat compression limited to the central zones;

or, if it is organic polymeric compounds which are involved, solvent etching in order to superficially depolymerise the central zone and effect adhesion by the application of pressure, this being followed by a polymerising heat-treatment.

In the case of a metallised disc (disc 400 in FIG. 4) the first of the aforesaid methods will be used.

What is claimed is:

1. A method for protecting an optically readable flexible record disc having a face comprising an engraved ring shaped zone wherein signals are engraved in the form of impressions along a track and a central flat zone, said method consisting in placing, close to said face, a flexible protective disc and in sticking the central flat zone of said record disc and the part of said flexible protective disc which face said central flat zone.

2. An optically readable protected disc comprising a flexible record disc having a face comprising an engraved ring shaped zone wherein signals are engraved in the form of impressions along a track and a central flat zone, and a flexible protective disc placed close to said face, said central flat zone and the part of said flexible protective disc facing said central zone being stuck together, the rotation of said protected disc during read-out by an optical read-out beam causing said flexible protective disc to move into contact against said engraved ring shaped zone of said record disc.

3. An optically readable protected disc as claimed in claim 2 wherein said flexible record disc and said flexible protective disc are transparent to said optical read-out beam, said optical read-out beam being transmitted during read-out through said protected disc.

4. An optically readable protected disc comprising a flexible record disc, transparent to a read-out beam, having a face comprising a ring shaped zone wherein signals are engraved in the form of impressions along a track and a central flat zone, and a flexible protective disc having a face reflective for said read-out beam arranged close to said face of said flexible record disc, said central flat zone and the part of said flexible protective disc facing said central zone being stuck together said read-out beam being transmitted through said flexible record disc and reflected on said reflective face when read-out.

* * * * *